United States Patent
Hara et al.

(10) Patent No.: US 11,605,057 B2
(45) Date of Patent: Mar. 14, 2023

(54) STORE MANAGEMENT SYSTEM, ELECTRONIC RECEIPT SYSTEM, AND STORE MANAGEMENT METHOD

(71) Applicant: TOSHIBA TEC KABUSHIKI KAISHA, Tokyo (JP)

(72) Inventors: Noriyoshi Hara, Mishima Shizuoka (JP); Takahiro Saitou, Izunokuni Shizuoka (JP); Atsushi Okamura, Mishima Shizuoka (JP); Yuta Sasaki, Izunokuni Shizuoka (JP); Masachika Kurata, Fujinomiya Shizuoka (JP); Takahide Kubota, Mishima Shizuoka (JP); Xiaozhou Wang, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 530 days.

(21) Appl. No.: 16/659,151

(22) Filed: Oct. 21, 2019

(65) Prior Publication Data
US 2020/0387875 A1    Dec. 10, 2020

(30) Foreign Application Priority Data
Jun. 4, 2019   (JP) .............................. JP2019-104797

(51) Int. Cl.
  *G06Q 20/04*   (2012.01)
  *G07C 9/00*   (2020.01)

(52) U.S. Cl.
  CPC ....... *G06Q 20/047* (2020.05); *G07C 9/00182* (2013.01)

(58) Field of Classification Search
  CPC ........ G06Q 30/04; G06Q 20/38; G06Q 20/14; G06Q 20/20; G06Q 30/00; G06Q 20/40;
  (Continued)

(56) References Cited

U.S. PATENT DOCUMENTS 3,665,448 A * 5/1972 McGlinchey ........ G08B 13/248
                                                    340/568.1
5,013,896 A * 5/1991 Ono ..................... G07G 1/0036
                                                    235/377
(Continued)

FOREIGN PATENT DOCUMENTS

CN   107705129 A   2/2018
EP   2975568 A1   1/2016

OTHER PUBLICATIONS

Extended European Search Report dated Jun. 25, 2020 mailed in corresponding European Patent Application No. 19210551.8, 27 pages.

*Primary Examiner* — Olusegun Goyea
(74) *Attorney, Agent, or Firm* — Kim & Stewart LLP

(57) ABSTRACT

According to an embodiment, a store management system includes a store entry management device and a sales management device. The store entry management device reads identification data, of a shopper, for using the electronic receipt service from an information terminal of a shopper who wants to enter the store. The sales management device causes the store entry management device to permit the shopper to enter the store when the settlement data can be acquired based on the read shopper identification data.

3 Claims, 8 Drawing Sheets

(58) Field of Classification Search
CPC ...... G06Q 40/00; G07G 1/0036; G07G 3/003; G07G 1/145; G08B 13/248; G08B 13/196; G08B 13/2402
USPC ..... 705/17, 21, 26.1, 44; 235/381, 382, 383; 348/61, 150, 540
See application file for complete search history.

(56) References Cited

U.S. PATENT DOCUMENTS

| | | | | |
|---|---|---|---|---|
| 5,992,570 | A * | 11/1999 | Walter | G07G 3/003 186/36 |
| 6,769,610 | B2 * | 8/2004 | Habara | G06Q 20/4014 235/382 |
| 7,076,441 | B2 * | 7/2006 | Hind | G06Q 10/087 705/7.29 |
| 7,143,938 | B2 * | 12/2006 | Hammerle | A47F 10/02 235/382 |
| 8,106,775 | B2 * | 1/2012 | Ohkawa | G06Q 20/208 340/10.5 |
| 9,082,114 | B2 * | 7/2015 | Colley | G07F 19/20 |
| 9,589,433 | B1 * | 3/2017 | Thramann | G07G 3/003 |
| 9,741,241 | B2 * | 8/2017 | Mizui | H04M 1/72421 |
| 2005/0205677 | A1 * | 9/2005 | Patel | G06K 7/10732 235/462.42 |
| 2007/0288322 | A1 * | 12/2007 | Watanabe | G06Q 20/3221 705/21 |
| 2008/0303902 | A1 * | 12/2008 | Romer | G08B 13/19656 348/143 |
| 2011/0063108 | A1 * | 3/2011 | Aonuma | G06Q 20/4016 340/540 |
| 2012/0327202 | A1 * | 12/2012 | Nagamachi | G07G 1/145 348/61 |
| 2014/0025515 | A1 * | 1/2014 | Argue | G06Q 20/389 705/21 |
| 2014/0160293 | A1 * | 6/2014 | Ristivojevic | G06Q 20/20 348/150 |
| 2014/0172610 | A1 * | 6/2014 | Carpenter | G06Q 20/40 705/26.1 |
| 2014/0347479 | A1 * | 11/2014 | Givon | G06V 40/103 382/116 |
| 2015/0039458 | A1 * | 2/2015 | Reid | A61B 5/117 705/26.1 |
| 2015/0194025 | A1 * | 7/2015 | Tsunoda | G06T 7/73 348/150 |
| 2015/0356538 | A1 * | 12/2015 | Okada | G06Q 20/209 705/17 |
| 2016/0005029 | A1 * | 1/2016 | Ivey | G06Q 20/4016 705/44 |
| 2016/0019514 | A1 | 1/2016 | Landers, Jr. et al. | |
| 2016/0110710 | A1 * | 4/2016 | Randall | G06Q 20/3274 705/44 |
| 2016/0210829 | A1 * | 7/2016 | Uchida | G06V 20/52 |
| 2016/0292662 | A1 * | 10/2016 | Kobayashi | G06V 10/147 |
| 2017/0309136 | A1 | 10/2017 | Schoner | |
| 2017/0316271 | A1 * | 11/2017 | Saitou | G06V 10/44 |
| 2018/0158063 | A1 * | 6/2018 | Jamtgaard | G06Q 10/06398 |
| 2018/0232796 | A1 * | 8/2018 | Glaser | G06Q 40/12 |
| 2018/0240180 | A1 * | 8/2018 | Glaser | G06V 20/64 |
| 2018/0268618 | A1 * | 9/2018 | Tsunoda | G07B 15/04 |
| 2019/0019173 | A1 * | 1/2019 | Kinno | G06T 1/0007 |
| 2019/0114488 | A1 * | 4/2019 | Glazer | G07G 1/0063 |
| 2019/0259015 | A1 * | 8/2019 | Jacquet | G07F 17/0064 |
| 2019/0333039 | A1 * | 10/2019 | Glaser | G06Q 20/209 |
| 2019/0371134 | A1 * | 12/2019 | Chen | G06V 10/40 |
| 2020/0134590 | A1 * | 4/2020 | Glaser | G06Q 20/085 |
| 2020/0184445 | A1 * | 6/2020 | Biggs | G06Q 20/3821 |
| 2020/0302417 | A1 * | 9/2020 | Wyper | G06Q 30/04 |

* cited by examiner

STORE MANAGEMENT SYSTEM, ELECTRONIC RECEIPT SYSTEM, AND STORE MANAGEMENT METHOD

CROSS-REFERENCE TO RELATED APPLICATION

This application is based upon and claims the benefit of priority from the prior Japanese Patent Application No. 2019-104797, filed on Jun. 4, 2019, the entire contents of which are incorporated herein by reference.

FIELD

Embodiments described herein generally relate to a store management system, an electronic receipt system including the store management system, and a store management method for the store management system.

BACKGROUND

An electronic receipt service for digitizing a receipt delivered from a store to a shopper at the time of settlement of a product purchased by a shopper is already known. In this electronic receipt service, an electronized receipt, so-called an electronic receipt, is obtained from an information terminals owned by the shopper.

The shopper using the electronic receipt service installs a dedicated application program on the information terminal. Then, the shopper activates this application program before settlement. Then, since the electronic receipt identification code is displayed on the display device of the information terminal, the shopper presents the electronic receipt identification code to the store clerk. The store clerk performs an operation for reading the electronic receipt identification code with a reading device provided in a point of sales (POS) terminal. In response to this operation, at the POS terminal, the process for electronic receipt service is executed together with settlement process of the product.

In recent years, with the development of artificial intelligence (AI) technology, a system has been developed in which behavior of the shopper is monitored from entry to the store to exit from the store, and a product purchased by the shopper based on the behavior is identified to perform settlement. When the store provides the system, the unattended store can be available.

However, in order for a shopper to use an unattended store equipped with the system, the shopper needs to perform membership registration for the unattended store. Further, the shopper needs to register settlement data such as a credit card number for an unattended store. In addition, the shopper is required to perform membership registration and settlement data registration for respective unattended stores. For this reason, a shopper who wants to use a plurality of unattended stores has to perform member registration and settlement data registration for respective unattended stores, and thus cannot feel complicated. In addition, the shopper may mistake the membership ID presented when entering the unattended store with the membership ID (electronic receipt identification code) of the electronic receipt service, which is not convenient.

DETAILED DESCRIPTION

Figure 1:
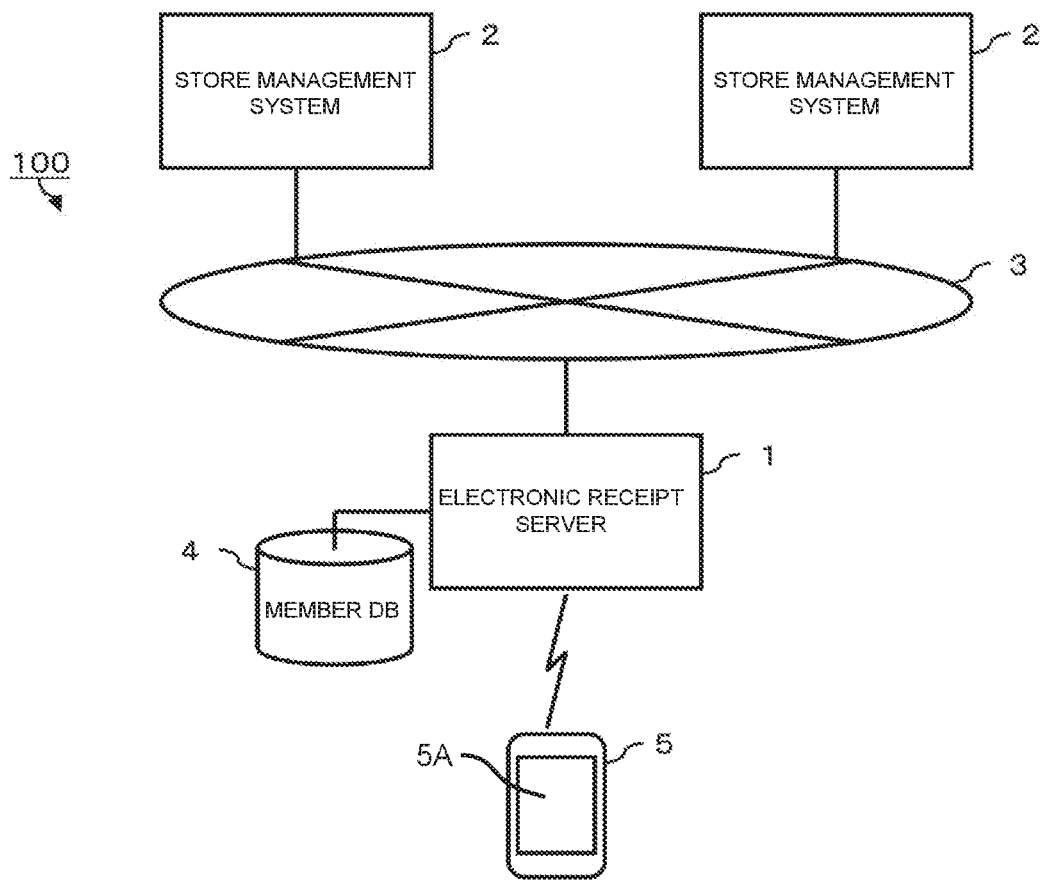
FIG. 1 is a block diagram illustrating an electronic receipt system according to an embodiment.

According to an embodiment, the store management system includes a store entry management device, a behavior monitoring device, a settlement processing device, a communication device, and a sales management device. The store entry management device reads, from a processing terminal possessed by a shopper who wants to enter the store, identification data of the shopper, and manages entry of the shopper into the store. The behavior monitoring device monitors behavior of the shopper who has entered the store. The settlement processing device performs a settlement process for the product purchased by the shopper. The communication device communicates with an external server that manages settlement data of the shopper in association with the shopper identification data. The sales management device acquires the shopper settlement data from the external server via the communication device based on the shopper identification data read by the store entry management device. Furthermore, the sales management device creates sales data of the product purchased by the shopper based on the monitoring result by the behavior monitoring device, and registers the created sales data in association with the acquired settlement data. Further, the sales management device causes the settlement processing device to perform the settlement process based on the acquired settlement data and the registered sales data. Further, the sales management device generates electronic receipt data based on the acquired settlement data and the registered sales data. Further, the sales management device transmits the generated receipt data together with the acquired settlement data to the external server via the communication device.

Hereinafter, an embodiment of the store management device that can improve the convenience of a shopper and an electronic receipt system including the device will be described with reference to the drawings. In the drawings, the same reference numerals indicate the same or similar parts.

FIG. 1 is a block diagram illustrating a schematic configuration of an electronic receipt system 100 according to the embodiment. The electronic receipt system 100 includes an electronic receipt server 1, a plurality of store management systems 2, and a network 3. Further, the electronic receipt system 100 may include an information terminal 5. The electronic receipt server 1 is a server for realizing an electronic receipt service. The electronic receipt server 1 is managed by an operating organization for the electronic receipt service. A store management system 2 is a computer system constructed in a store that is an unattended store and has joined an operating organization in order to introduce an electronic receipt service, that is, a member store of a so-called electronic receipt service. The network 3 enables bidirectional data communication between the electronic receipt server 1 and the plurality of store management systems 2. In the network 3, the electronic receipt server 1 and the plurality of store management systems 2 may be connected by wire or may be connected via radio. As this type of network 3, for example, the Internet, an intranet, or the like can be used.

The electronic receipt server 1 manages a member database 4. The member database 4 may be provided in a storage device built in the electronic receipt server 1 or may be provided in an externally connected storage device.

The member database 4 stores a member record 40 (see FIG. 2) created for each member of the electronic receipt service. A member of the electronic receipt service is a shopper who has installed an application program exclusively for the electronic receipt, a so-called electronic receipt application program, on the information terminal 5 to receive the electronic receipt service. By installing the electronic receipt application program on the information terminal 5, a unique electronic receipt identification code, a so-called electronic receipt ID, is issued, as a membership ID of the electronic receipt service, to the shopper who is the user of the information terminal 5. In this way, the shopper becomes a member of the electronic receipt service. The shopper who becomes a member of the electronic receipt service operates the information terminal 5 to register settlement data in the electronic receipt server 1. The settlement data is data of a shopper (member of an electronic receipt service) necessary for the electronic settlement. The settlement data is data of a settlement card such as a credit card, an electronic money card, or a prepaid card. The bank account information or the electronic settlement service information may be registered in the member record 40 of the member database 4 as settlement data.

Figure 2:
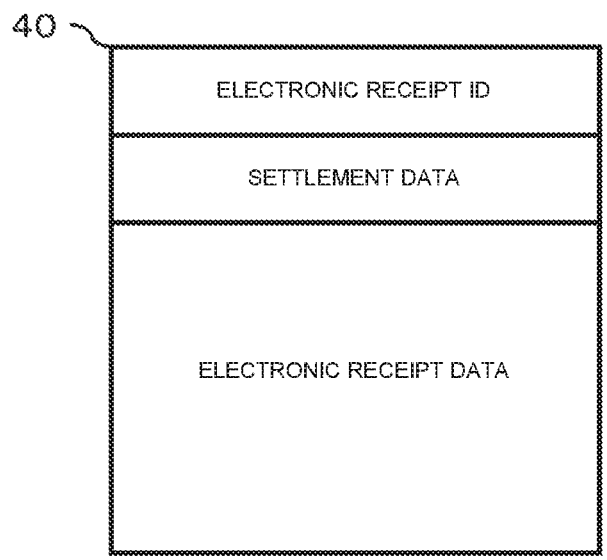
FIG. 2 is a schematic diagram illustrating a data structure of a member record stored in the member database in the electronic receipt system according to an embodiment.

FIG. 2 is a schematic diagram showing the data structure of the member record 40. As illustrated, the member record 40 includes an electronic receipt ID (electronic receipt service membership ID), settlement data, and electronic receipt data. The settlement data is data registered by a shopper (member of the electronic receipt service) whose electronic receipt ID has been issued. The electronic receipt data is obtained by digitizing receipt data generated at the time of settlement of a product purchased by a member of the electronic receipt service at a store. The electronic receipt data includes a store code, transaction date/time, POS terminal number, responsible person code, product code, product name, unit price, the number of products, sales amount, total number, total amount, and the like. A plurality of electronic receipt data can be recorded in the member record 40.

Figure 3:
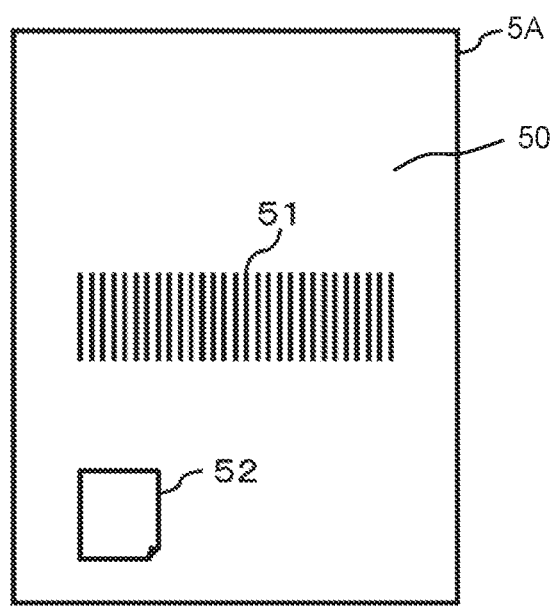
FIG. 3 is a schematic diagram of a home screen displayed on the display device of the information terminal in which the electronic receipt application program according to an embodiment is activated.

FIG. 3 is a schematic diagram of a home screen 50 displayed on a display device 5A of the information terminal 5 by starting the electronic receipt application program. As shown in the figure, on the home screen 50, a barcode symbol 51 and a receipt icon 52 are arranged (displayed). The barcode symbol 51 is a barcode system of an electronic receipt ID issued to a member of the electronic receipt service that is a user of the information terminal 5. The receipt icon 52 is for calling up a list of the electronic receipt data recorded in the member record 40 together with the electronic receipt ID. When the member of the electronic receipt service performs an input operation (for example, a touch operation) on the receipt icon 52, a list of electronic receipt data generated by the transaction with the member of the electronic receipt service is displayed on the display device 5A of the information terminal 5. The list of electronic receipt data is, for example, a list of data that lists the transaction date and time, store name, and total amount of each electronic receipt data. When the member of the electronic receipt service specifies the desired electronic receipt data from this list, the electronic receipt data is downloaded from the electronic receipt server 1 to the information terminal 5, and the receipt image is displayed on the display device 5A of the information terminal 5. In this way, the member of the electronic receipt service can obtain a receipt as electronic data.

Figure 4:
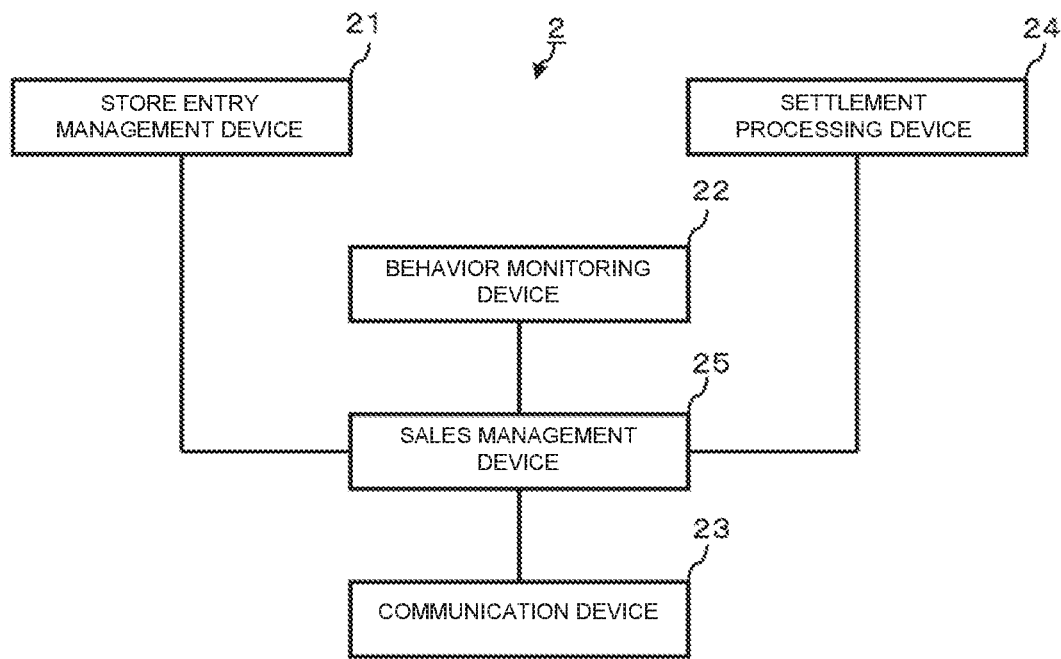
FIG. 4 is a block diagram illustrating the store management system according to an embodiment.

FIG. 4 is a block diagram showing a schematic configuration of the store management system 2. The store management system 2 enables the unattended store and application of the electronic receipt service. The store management system 2 includes a store entry management device 21, a behavior monitoring device 22, a communication device 23, a settlement processing device 24, and a sales management device 25. Then, the store management system 2 constructs a system by electrically connecting the store entry management device 21, the behavior monitoring device 22, the communication device 23, and the settlement processing device 24 to the sales management device 25.

The store entry management device 21 is a device that permits a shopper who has been approved based on the authentication result to enter the store, and rejects entry of the shopper who has not been approved into the store. The shopper permitted to enter the store is a member of the electronic receipt service and a member of the unattended store.

Figure 5:
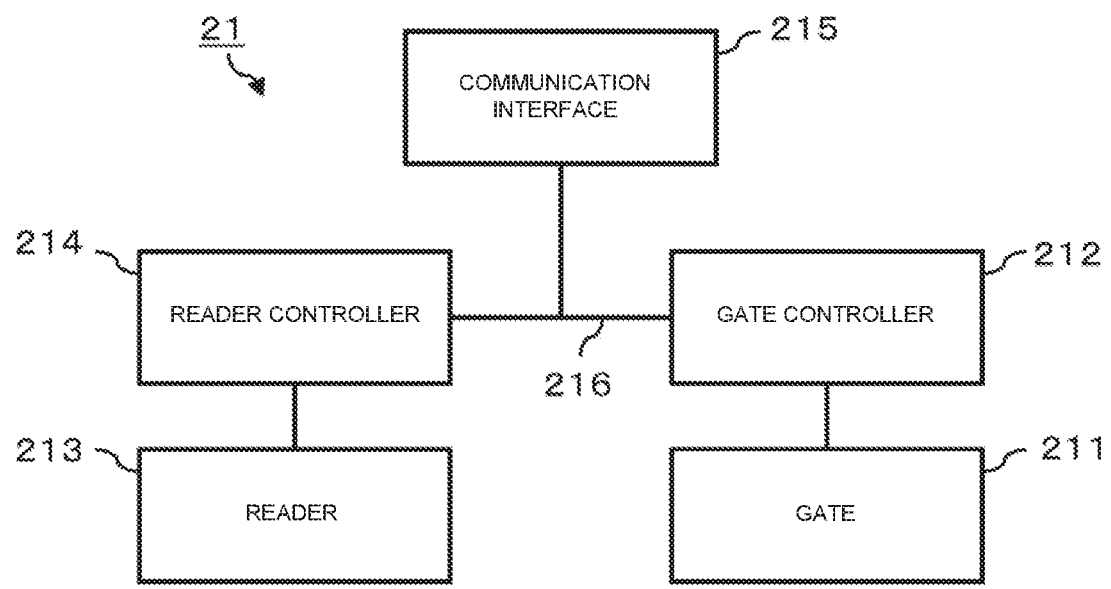
FIG. 5 is a block diagram illustrating a store entry management device included in the store management system according to an embodiment.

FIG. 5 is a block diagram showing a main circuit configuration of the store entry management device 21. The store entry management device 21 includes a gate 211 and a gate controller 212, a reader 213 and a reader controller 214, and a communication interface 215. The gate controller 212, the reader controller 214, and the communication interface 215 are connected by a transmission path 216.

The gate 211 opens and closes the store entrance. The gate controller 212 controls opening and closing of the gate 211. When the gate 211 is closed, the shopper cannot enter the store. When the gate 211 is opened, the shopper can enter the store and purchase goods.

The reader 213 is a device for reading the data of the barcode symbol 51. Specifically, the reader 213 reads the data of the barcode symbol 51 including the membership ID of the electronic receipt service of the shopper who performs authentication for entering the store. The reader 213 is provided outside the store entrance. The reader controller 214 analyzes the data of the barcode symbol 51 read by the reader 213, and acquires the membership ID of the electronic receipt service that has been converted into a barcode system. The reader 213 has a lamp, and when an error occurs in association with the reading of the barcode symbol 51, the lamp blinks to make a notification of the error. The reader 213 can read barcode symbol data in which a membership ID of an unattended store is converted into a barcode system. In the following description, both the membership ID of the unattended store and the membership ID of the electronic receipt service may be collectively simply referred to as the membership ID.

The communication interface 215 is an interface for performing data communication with the sales management device 25. The communication interface 215 transmits the data of the barcode symbol 51 (membership ID of the electronic receipt service) obtained by the reader 213 under the control of the reader controller 214 to the sales management device 25. The communication interface 215 outputs the gate open signal received from the sales management device 25 to the gate controller 212.

Returning to FIG. 4, the description will be made. The behavior monitoring device 22 monitors the behavior of the shopper who has entered the store (store visitor) using a large number of sensors arranged in the store. Examples of the sensor include a camera, an optical sensor, an infrared sensor, a temperature sensor, a weight sensor, and the like. The behavior monitoring device 22 can detect the product purchase behavior of the shopper, the store leaving behavior of the shopper, and the like as the shopper's behavior from the information of these sensors. The behavior monitoring device 22 is a well-known device used in an existing unattended store, and a detailed description thereof will be omitted here.

The communication device 23 performs data communication with the electronic receipt server 1 connected via the network 3. When receiving a data transmission command from the sales management device 25, the communication device 23 establishes a line with the electronic receipt server 1 according to a predetermined communication protocol, and transmits the data to the electronic receipt server 1. The communication device 23 outputs the data received from the electronic receipt server 1 to the sales management device 25 via the network 3.

The settlement processing device 24 settles the product purchased by the shopper based on the shopper's settlement data. When the settlement data is data of a credit card, the settlement processing device 24 performs the settlement by credit. When the settlement data is data of an electronic money card, the settlement processing device 24 performs the settlement by electronic money. When the settlement data is prepaid card data, the settlement processing device 24 performs the settlement by the prepaid card. Since the settlement processing device 24 is a well-known device used in an existing unattended store, detailed description thereof is omitted here.

The sales management device 25 has the following first to fifth functions. The first function is a function of authenticating the shopper in cooperation with the store entry management device 21 and the communication device 23. The second function is a function of acquiring settlement data of the shopper in cooperation with the communication device 23. The third function is a function of registering, as a purchase product of the shopper, in cooperation with the behavior monitoring device 22, a product that the shopper has taken out of the product display shelf. The fourth function is a function of processing the settlement of the product purchased by the shopper in cooperation with the settlement processing device 24. The fifth function is a function of transmitting electronic receipt data of a settled transaction to the electronic receipt server 1 in cooperation with the communication device 23.

Figure 6:
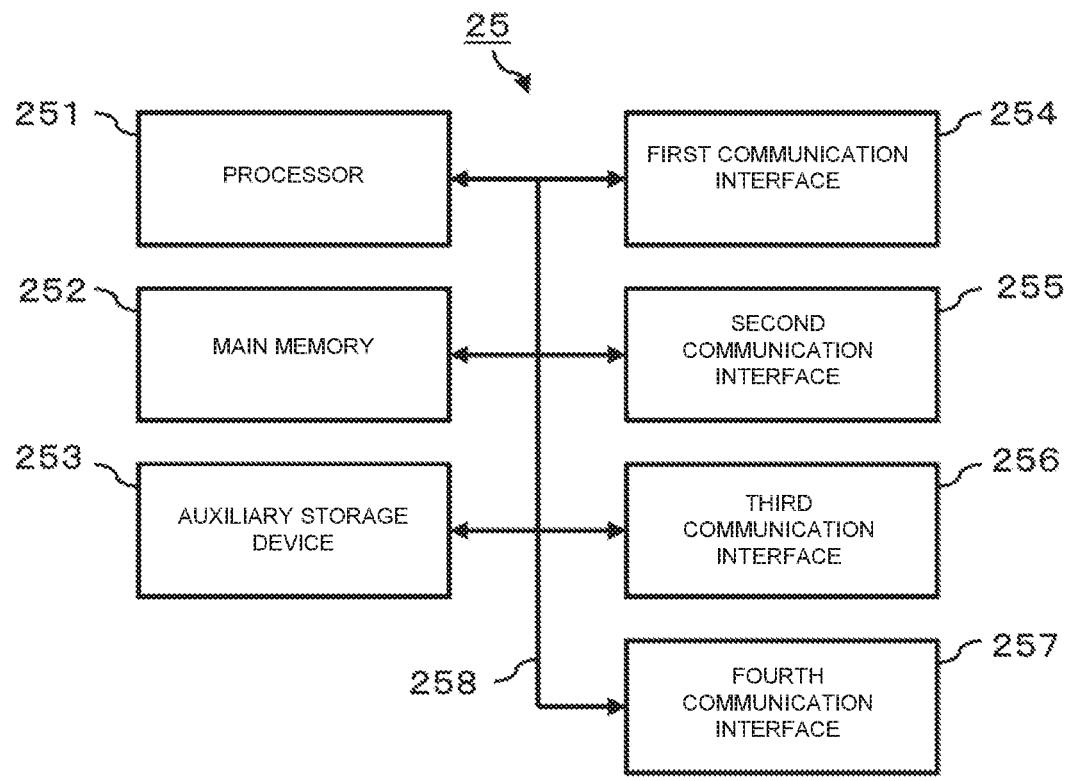
FIG. 6 is a block diagram illustrating a sales management device included in the store management system according to the embodiment.

FIG. 6 is a block diagram showing a main circuit configuration of the sales management device 25. The sales management device 25 includes a processor 251, a main memory 252, an auxiliary storage device 253, a first communication interface 254, a second communication interface 255, a third communication interface 256, a fourth communication interface 257, and a transmission path 258. The transmission path 258 includes an address bus, a data bus, a control signal line, and the like. The sales management device 25 connects the processor 251, the main memory 252, the auxiliary storage device 253, the first communication interface 254, the second communication interface 255, the third communication interface 256, and the fourth communication interface 257 to the transmission path 258. In the sales management device 25, a computer is constituted by the processor 251, the main memory 252, the auxiliary storage device 253, and the transmission path 258 connecting them.

The processor 251 corresponds to the central part of the computer. The processor 251 controls each component of the sales management device 25 in order to realize various functions as the sales management device 25 in accordance with the operating system or the application program. The processor 251 is, for example, a central processing unit (CPU).

The main memory 252 corresponds to the main storage portion of the computer. The main memory 252 includes a nonvolatile memory area and a volatile memory area. The main memory 252 stores an operating system or application program in a non-volatile memory area. The main memory 252 stores data necessary for the processor 251 to execute processing for controlling each unit in a volatile memory area. The main memory 252 may store the data in a nonvolatile memory area. The main memory 252 uses a volatile memory area as a work area in which data is appropriately rewritten by the processor 251. The nonvolatile memory area is, for example, a read only memory (ROM). The volatile memory area is, for example, a random access memory (RAM).

The auxiliary storage device 253 corresponds to the auxiliary storage portion of the computer. Examples of the auxiliary storage device 253 include an electric erasable programmable read-only memory (EEPROM), a hard disc drive (HDD), and a solid state drive (SSD). The auxiliary storage device 253 stores data used when the processor 251 performs various processes, data created by the processes in the processor 251, and the like. The auxiliary storage device 253 may store the above application program.

The application program stored in the main memory 252 or the auxiliary storage device 253 includes a control program described regarding information processing performed by the sales management device 25. A method for installing the control program in the main memory 252 or the auxiliary storage device 253 is not particularly limited. By recording the control program on a removable recording medium, or alternatively, by distributing the control program by communication over the network, the control program can be installed in the main memory 252 or the auxiliary storage device 253. The recording medium such as a CD-ROM or a memory card may be in any form as long as it can store a program and can be read by the device.

The first communication interface 254 is connected to the store entry management device 21 and performs data communication with the store entry management device 21. The second communication interface 255 is connected to the behavior monitoring device 22 and performs data communication with the behavior monitoring device 22. The third communication interface 256 is connected to the communication device 23 and performs data communication with the communication device 23. The fourth communication interface 257 is connected to the settlement processing device 24 and performs data communication with the settlement processing device 24.

Figure 7:
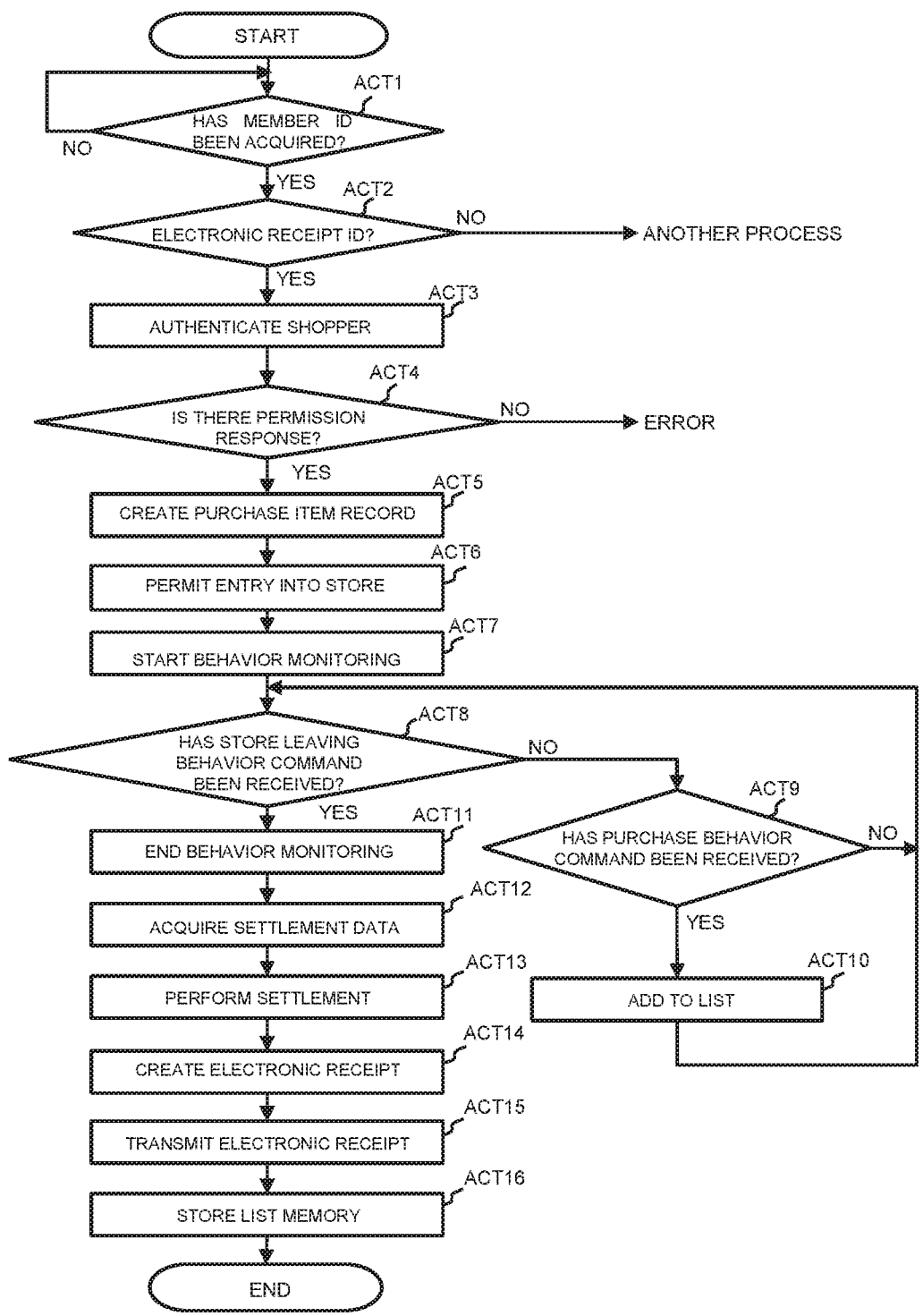
FIG. 7 is a flowchart showing main information processing executed by the processor of the sales management device according to an embodiment in accordance with the control program.

FIG. 7 is a flowchart showing a main information processing procedure executed by the processor 251 in accordance with the control program. Hereinafter, the main operation of the sales management device 25 from when a shopper who is a member of the electronic receipt service enters a store to when the shopper purchases a product, and leaves the store will be described with reference to the flowchart of FIG. 7. In the description of the operation, the first to fifth functions described above will be clarified. Note that the operation procedure described below is an example. The procedure and contents are not particularly limited as long as similar results can be obtained.

First, a shopper who wants to enter the store operates the information terminal 5 to activate an electronic receipt application program. Then, the home screen 50 is displayed on the display device 5A of the information terminal 5. The shopper makes the reader 213 of the store entry management device 21 read the barcode symbol 51 displayed on the home screen 50. Then, the data of the barcode symbol 51, that is, the electronic receipt ID (the membership ID of the electronic receipt service) is transmitted from the store entry management device 21 to the sales management device 25.

In ACT1 in FIG. 7, the processor 251 of the sales management device 25 waits for the membership ID of the shopper (person who want to enter the store) who wants to enter the store by determining whether the first communication interface 254 has received a membership ID (member identification data) from the store entry management device 21. The membership ID is input via the reader 213 of the store entry management device 21. When the processor 251 determines that the first communication interface 254 has received the membership ID from the store entry management device 21 (YES in ACT1), the process by the processor 251 proceeds to ACT2. In ACT2, the processor 251 determines whether the received membership ID is an electronic receipt ID (membership ID of the electronic receipt service).

As the membership ID (member identification data) in this case, in addition to the electronic receipt ID, a membership ID of an unattended store issued to a shopper who has performed registration as a member of an unattended store is also received. When the processor 251 determines that the received membership ID is an electronic receipt ID (membership ID of the electronic receipt service) (YES in ACT2), the process by the processor 251 proceeds to ACT3. The processor 251 authenticates the shopper in ACT3. That is, the processor 251 notifies the communication device 23 of an authentication request via the third communication interface 256. Upon receiving this notification, the communication device 23 transmits an authentication command to the electronic receipt server 1. The authentication command includes the electronic receipt ID acquired from the store entry management device 21.

The authentication command is transmitted to the electronic receipt server 1 via the network 3. The electronic receipt server 1 searches the member database 4 and determines whether there is an electronic receipt ID included in the authentication command. When the corresponding electronic receipt ID exists in the member database 4, the electronic receipt server 1 transmits a permission response command. The permission response command includes settlement data recorded in the member database 4 in association with the electronic receipt ID. When the corresponding electronic receipt ID does not exist in the member database 4, the electronic receipt server 1 transmits an error response command. The permission response command or the error response command is received via the network 3 by the store management system 2 that is the authentication command transmission source.

Processor 251 authenticates the shopper in ACT3 and then, in ACT4, waits for receiving a permission response command from the electronic receipt server 1 by determining whether the communication device 23 has received the permission response command from the electronic receipt server 1. The processor 251 determines that the communication device 23 has not received the permission response command from the electronic receipt server 1, that is, has received an error response command as a response command (NO in ACT4), the processor 251 executes the error process. The error process includes a process of making a notification that an error has occurred, for example, by blinking the lamp of the reader 213 of the store entry management device 21.

When the processor 251 determines that the communication device 23 has received the permission response command from the electronic receipt server 1 (YES in ACT4), the process by the processor 251 proceeds to ACT5. In ACT5, the processor 251 creates a purchase item list record 60 (see FIG. 8) in the volatile area of the main memory 252. Hereinafter, the purchase item list record 60 may be simply referred to as the purchase item record 60.

Figure 8:
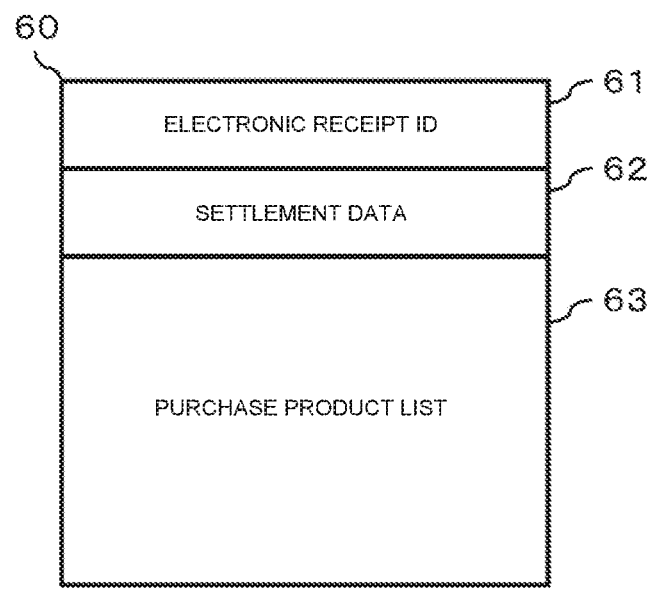
FIG. 8 is a schematic diagram showing a data structure of a list record formed in a main memory area of the sales management device according to the embodiment.

FIG. 8 is a schematic diagram showing the data structure of the purchase item record 60. As shown in FIG. 8, the purchase item record 60 includes an electronic receipt ID region 61, a settlement data region 62, and a purchase product list region 63. The processor 251 acquires the electronic receipt ID and the settlement data from the permission response command, and describes them in the region 61 and the region 62 of the purchase item record 60.

In this way, the sales management device 25 performs the first function of authenticating the shopper in cooperation with the store entry management device 21 and the communication device 23. Further, the sales management device 25 cooperates with the communication device 23 to perform the second function of acquiring shopper settlement data.

Returning to FIG. 7, the description will be made. After creating the purchase item record 60, the processor 251 issues a store entry permission in ACT6. Specifically, the processor 251 performs control so that the first communication interface 254 transmits a store entry permission command. With this control, the store entry permission command is transmitted from the first communication interface 254 to the store entry management device 21. The store entry permission command is received by the communication interface 215 of the store entry management device 21. The gate controller 212 opens the gate 211 by acquiring the received store entry permission command. When the shopper passes through the gate 211, the gate controller 212 closes the gate 211.

In this way, the shopper who is a member of the electronic receipt service and whose electronic receipt ID is read by the reader 213 of the store entry management device 21 can enter the store through the gate 211. That is, the shopper becomes a store visitor.

Now, the shopper who has entered the store (store visitor) takes out a product the shopper wants to purchase from among the products displayed on the product display shelf. The shopper may hold the picked-up product by hand, or store it in a container such as a his/her bag or a shopping basket. When the shopper finishes shopping, the shopper leaves the exclusive exit to the outside of the store. Such behavior of the shopper is tracked and monitored for respective individuals by the behavior monitoring device 22.

The processor 251 of the sales management device 25 instructs the behavior monitoring device 22 to start monitoring the behavior of the shopper in the ACT 7 after issuing the store entry permission. Specifically, the processor 251 performs control so that the second communication interface 255 transmits a behavior monitoring start command. With this control, the behavior monitoring start command is transmitted from the second communication interface 255 to the behavior monitoring device 22. The behavior monitoring start command includes the electronic receipt ID acquired in the ACT1 process.

The behavior monitoring device 22 that has received the behavior monitoring start command identifies the shopper who has entered the store from gate 211 based on the electronic receipt ID included in the behavior monitoring start command, and starts to track behavior of the shopper. Then, when detecting the behavior of the tracked shopper taking out the product from the product display shelf, the behavior monitoring device 22 determines that the purchase behavior has been detected. The behavior monitoring device 22 identifies a product taken out by the shopper and outputs a purchase behavior command to the sales management device 25. The purchase behavior command includes the product code of the product specified as the product taken out by the shopper and the electronic receipt ID of the shopper who performed the purchase behavior. In addition, the behavior monitoring device 22 makes a determination of the store leaving behavior of the shopper by detecting that the tracked shopper has left the store. The behavior monitoring device 22 outputs a store leaving behavior command to the sales management device 25. The store leaving behavior command includes the electronic receipt ID of the shopper who performed the store leaving behavior.

The processor 251 that has instructed the start of the shopper behavior monitoring determines whether the second communication interface 255 has received the store leaving behavior command in ACT8. When the processor 251 determines that the second communication interface 255 has not received the store leaving behavior command (NO in ACT8), the process by the processor 251 proceeds to ACT9. In ACT9, the processor 251 determines whether the second communication interface 255 has received a purchase behavior command. When the processor 251 determines that the second communication interface 255 has not received the purchase behavior command (NO in ACT9), the process by the processor 251 returns to ACT8. In this way, the processor 251 waits for whether to receive a store leaving behavior command or a purchase behavior command in ACT8 and ACT9.

In the wait state of ACT8 and ACT9, when processor 251 determines that second communication interface 255 has received a purchase behavior command (YES in ACT9), the process by processor 251 proceeds to ACT10. In ACT10, the processor 251 creates sales data of the product based on the product code of the product included in the purchase behavior command. Then, the processor 251 registers this sales data in the region 63 (see FIG. 8) of the purchase item record 60 in which the electronic receipt ID included in the purchase behavior command is described. Note that the sales data includes at least a product code, a unit price, the number of products, and a sales amount. The unit price is set in advance in association with the product code. The initial value of the number of products is "1". Thereafter, when sales data of the same product code is registered, the number of products of the sales data is incremented by one. The sales amount is an amount obtained by multiplying the unit price by the number of products. After the processor 251 performs the process of ACT10, the process by the processor 251 returns to the wait state of ACT8 and ACT9.

As described above, the sales management device 25 cooperates with the behavior monitoring device 22 to perform the third function of registering the product taken out by the shopper from the product display shelf as the product purchased by the shopper.

In the wait state of ACT8 and ACT9, when processor 251 determines that second communication interface 255 has received the store leaving behavior command (YES in ACT8), the process by processor 251 proceeds to ACT11. In ACT11, the processor 251 performs control so that the second communication interface 255 transmits a behavior monitoring end command. With this control, the behavior monitoring end command is transmitted from the second communication interface 255 to the behavior monitoring device 22. The behavior monitoring end command includes the electronic receipt ID acquired in the process of ACT1.

The behavior monitoring device 22 that has received the behavior monitoring end command ends the tracking of the behavior of the shopper identified by the electronic receipt ID included in the behavior monitoring end command.

The processor 251 that has instructed the end of the shopper's behavior monitoring acquires settlement data in ACT12. The settlement data is data described in the region of the purchase item record 60 specified by the electronic receipt ID included in the store leaving behavior command. The processor 251 also acquires the sales data described in the region 63 of the purchase item record 60 together with the settlement data.

The processor 251 instructs the settlement processing device 24 to perform settlement in ACT13. Specifically, the processor 251 performs control so that the fourth communication interface 257 transmits a settlement command to the settlement processing device 24. With this control, the settlement command is transmitted from the fourth communication interface 257 to the settlement processing device 24. The settlement command includes settlement data and sales data. The settlement processing device 24 that has received the settlement command performs settlement of the product purchased by the shopper based on the settlement data. That is, when the settlement data is credit card data, the settlement processing device 24 performs the settlement by credit. When the settlement data is electronic money card data, the settlement processing device 24 performs the settlement by electronic money. When the settlement data is prepaid card data, the settlement processing device 24 performs the settlement by the prepaid card.

As described above, the sales management device 25 cooperates with the settlement processing device 24 to perform the fourth function of processing settlement of the product purchased by the shopper.

The processor 251 that has instructed the settlement creates electronic receipt data based on the sales data described in the region 63 of the purchase item record 60 in ACT14. The electronic receipt data includes a store code, transaction date and time, a product code, a product name, a unit price, the number of products, a sales price, a total number, a total price, and the like. In ACT 15, the processor 251 instructs the third communication interface 256 to transmit the electronic receipt data. That is, the processor 251 performs control so that the third communication interface 256 transmits the electronic receipt data. With this control, electronic receipt data is transmitted from the third communication interface 256 to the electronic receipt server 1. The electronic receipt ID described in the region 61 of the purchase item record 60 is associated with the electronic receipt data. The electronic receipt server 1 searches the member database 4 and adds the electronic receipt data (see FIG. 2) to the member record in which the electronic receipt ID is described.

As described above, the sales management device 25 cooperates with the communication device 23 to perform the fifth function of transmitting the electronic receipt data of the settled transaction to the electronic receipt server 1.

The processor 251 that has instructed transmission of the electronic receipt stores the purchase item record 60 in the auxiliary storage device 253 in ACT16. Thus, the processor 251 ends the process according to the control program.

In addition, when the processor 251 determines that the received membership ID (member identification data) is not an electronic receipt ID (membership ID of the electronic receipt service), but is a membership ID of an unattended store (NO in ACT2), the processor 251 executes another process. The another process is basically a process in which the electronic receipt ID is replaced with the membership ID of the unattended store in the processes after ACT3. However, the processes of ACT14 and ACT15 are omitted.

Here, the computer having the processor 251 as its main body configures code acquisition means by executing the processes of ACT1 and ACT2 in cooperation with the store entry management device 21. In other words, the computer acquires, from the shopper who has entered the store (store visitor), an electronic receipt ID, that is, an electronic receipt identification code (membership ID of the electronic receipt service) for using the electronic receipt service.

In addition, the computer configures data acquisition means by executing the processes of ACT3 to ACT5 in cooperation with the communication device 23. That is, the computer makes an inquiry to the electronic receipt server based on the electronic receipt ID, and acquires settlement data associated with the electronic receipt ID from the electronic receipt server 1.

Further, the computer configures permission means by executing the process of ACT6 in cooperation with the store entry management device 21. That is, when the computer acquires settlement data associated with the electronic receipt ID from the electronic receipt server 1, the computer opens the gate 211 and permits the shopper to enter the store.

In addition, the computer configures product detection means and registration means by executing the processes of ACT7 to ACT11 in cooperation with the behavior monitoring device 22. In other words, the computer monitors the behavior of the shopper who has entered the store (store visitor) based on the data from the behavior monitoring device 22, and detects the purchased product when detecting the purchase behavior of the shopper who has entered the store. Then, the computer registers the sales data of the product in the purchase item record 60 in association with the electronic receipt ID of the shopper who has entered the store.

In addition, the computer configures settlement means by executing the processes of ACT12 and ACT13 in cooperation with the settlement processing device 24. In other words, when it is determined, from the behavior of the shopper who has entered the store (store visitor), that the shopper has left the store, the computer executes the settlement of the product registered in the purchase item record 60 in association with the electronic receipt ID of the shopper using the settlement data acquired from the electronic receipt server 1.

In addition, the computer configures transmission means by executing the processes of ACT14 and ACT15 in cooperation with the communication device 23. That is, the computer creates the electronic receipt data in which the receipt data generated based on the sales data registered in the purchase item record 60 is digitized. The computer transmits the created electronic receipt data to the electronic receipt server 1 together with the electronic receipt ID of the purchase item record 60.

In this way, the store management system 2 functions as a store management device having code acquisition means, data acquisition means, registration means, settlement means, and transmission means. According to the above-described store management device, not only a member of an unattended store that has performed membership registration for the unattended store, but also a member of the electronic receipt service is included as a user of the unattended store. That is, a member of the electronic receipt service can use a plurality of unattended stores included in the store management system 2 only by presenting the member's unique electronic receipt ID when entering the store. Therefore, the shopper who is a member of the electronic receipt service does not have to perform membership registration for respective unattended stores. In addition, since the membership ID presented at the time of entering the store is unified, there is no need to worry about mistakes and the convenience of shoppers can be improved.

Further, the store management system 2 also functions as a store management device that further has permission means. According to the store management device described above, even when the shopper is not a member of an unattended store, the shopper is permitted to enter the unattended store as long as the shopper is a member of the electronic receipt service. Since the settlement data is registered for the shopper permitted to enter the store, it is not necessary for the shoppers to perform special operations for settlement when leaving the store. Therefore, the convenience of members of the electronic receipt service can be further improved. In addition, the settlement means performs settlement of the product purchased by the shopper when it is determined, from the behavior of the shopper who has entered the store (store visitor), that the shopper has left the store. Therefore, since the shopper who has entered the store (store visitor) is not required to perform a special operation for settlement, the convenience of the shoppers can be further improved.

Further, the store management system 2 also functions as a store management device having product detection means. According to the above-described store management device, since the complicated operation for registering the data of the product purchased by the shopper can be eliminated, the convenience of the shopper can be further improved.

As mentioned above, although embodiments of the store management device which can improve the convenience of a shopper, and an electronic receipt system including the device are described, the embodiments are not limited to the above descriptions.

In the above-described embodiments, the behavior of the shopper who has entered the store (store visitor) is monitored, and the product purchased by the shopper is detected from the behavior. In this regard, the shopper who has entered the store may operate the information terminal 5 and, for example, scan the barcode of the purchased product so that the purchased product is detected. As for the settlement, the shopper who has entered the store may operate the information terminal 5 to instruct the settlement start. In any case, since the membership ID (member identification data) presented by the shopper when entering the store may be the electronic receipt ID, the convenience of the shopper can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A store management system comprising:
a store entry management device including:
a gate at an entrance of a store;
a reader provided at an outside of the entrance and configured to read, from a processing terminal owned by a shopper who wants to enter a store, identification data of the shopper; and
a gate controller configured to control the gate to be in an open state and in a closed state with a gate control signal generated based on the read identification data of the shopper;
a behavior monitoring device including a plurality of sensors provided in the store and configured to monitor behavior of the shopper that has entered the store;
a settlement processing device that performs a settlement process for a product purchased by the shopper;
a communication device that communicates with an external server that manages settlement data of the shopper in association with an ID of the shopper for an electronic receipt service; and
a sales management device configured to:
determine whether the identification data of the shopper read by the reader is an ID for the electronic receipt service,
upon determining that the identification data is the ID for the electronic receipt service, control the communication device to transmit the ID for the electronic receipt service to the external server for authentication of the shopper,
upon the authentication of the shopper being successful, generate the gate control signal to cause the gate to be in the open state and create a purchase item record for the shopper in association with the settlement data of the shopper that is acquired from the external server via the communication device and the ID of the shopper for the electronic receipt service,
create sales data of a product purchased by the shopper based on a monitoring result by the behavior monitoring device, and register the created sales data in the purchase item record,
cause the settlement processing device to perform the settlement process based on the settlement data associated with the purchase item record and the sales data registered in the purchase item record,
generate electronic receipt data based on the settlement data associated with the purchase item record and the sales data registered in the purchase item record, and
transmit the generated electric receipt data, together with the settlement data, to the external server via the communication device.

2. The store management system according to claim 1, wherein the behavior monitoring device detects a product purchased by the shopper by monitoring behavior of the shopper who has entered the store.

3. The store management system according to claim 1, wherein
the sales management device determines, based on a monitoring result by the behavior monitoring device, that the shopper has left the store, and
the sales management device causes the settlement processing device to perform the settlement process when the sales management device determines that the shopper has left the store.

* * * * *